US012799718B2

(12) United States Patent
Mann

(10) Patent No.: US 12,799,718 B2
(45) Date of Patent: Nov. 17, 2026

(54) SYSTEM AND METHOD FOR PROTECTING A HYDRAULIC SYSTEM OF A WORK MACHINE

(71) Applicant: Komatsu America Corp., Chicago, IL (US)

(72) Inventor: Greggory Mann, Rocky Face, GA (US)

(73) Assignee: Komatsu America Corp., Chicago, IL (US)

( * ) Notice: Subject to any disclaimer, the term of this patent is extended or adjusted under 35 U.S.C. 154(b) by 0 days.

(21) Appl. No.: 18/817,434

(22) Filed: Aug. 28, 2024

(65) Prior Publication Data

US 2025/0075469 A1 Mar. 6, 2025

Related U.S. Application Data

(60) Provisional application No. 63/579,434, filed on Aug. 29, 2023.

(51) Int. Cl.

| | |
|---|---|
| ***E02F 9/22*** | (2006.01) |
| ***F16L 17/04*** | (2006.01) |
| ***F16L 21/06*** | (2006.01) |

(52) U.S. Cl.

CPC ............ *E02F 9/2275* (2013.01); *F16L 17/04* (2013.01); *F16L 21/065* (2013.01)

(58) Field of Classification Search

CPC ......... F16L 17/04; F16L 21/06; F16L 21/065; E02F 9/22; E02F 9/2275; F16J 9/02;

(Continued)

(56) References Cited

U.S. PATENT DOCUMENTS

| | | | | |
|---|---|---|---|---|
| 2,015,019 A * | 9/1935 | Light | ......................... | F16J 9/20 277/467 |
| 2,443,853 A | 6/1948 | Fall | | |

(Continued)

FOREIGN PATENT DOCUMENTS

| | | |
|---|---|---|
| CN | 215486943 U | 1/2022 |
| FR | 1363852 A | 6/1964 |

OTHER PUBLICATIONS

International Search Report and Written Opinion regarding App. No. PCT/US2024/044421 dated Nov. 15, 2024.

(Continued)

*Primary Examiner* — Christine M Mills
*Assistant Examiner* — L. Susmitha Koneru
(74) *Attorney, Agent, or Firm* — Husch Blackwell LLP

(57) ABSTRACT

A hydraulic cylinder may include a cylinder, a rod slidingly disposed in the cylinder, and a scraper assembly. The cylinder extends between a first end and a second end and includes a retention feature positioned adjacent to the first end. The scraper assembly circumscribes the rod and the cylinder. The scraper assembly includes a ring, a collar and a plate. The ring includes an outer surface and a radially spaced inner surface. The inner surface contacts a portion of the rod. The collar includes a first portion adjacent to a first surface contacting the outer surface of the ring and a second portion adjacent to a second surface contacting the retention feature of the cylinder. The plate contacts the first surface of the collar. The collar and the plate cooperate to radially compress the first semi-circular ring and the second semi-circular ring against the rod.

21 Claims, 9 Drawing Sheets

(58) Field of Classification Search

CPC ...... F16J 9/20; F16J 9/203; F16J 9/206; F16J 9/24; F16J 15/56

See application file for complete search history.

(56) References Cited

U.S. PATENT DOCUMENTS

| | | | | |
|---|---|---|---|---|
| 2,737,404 | A | 3/1956 | Lapsley | |
| 3,830,508 | A | 8/1974 | Endicott | |
| 3,866,924 | A | 2/1975 | French | |
| 4,003,297 | A | 1/1977 | Mott | |
| 4,055,107 | A * | 10/1977 | Bartley | F16J 15/56 277/563 |
| 4,089,253 | A | 5/1978 | Visser | |
| 4,106,592 | A * | 8/1978 | Siems | F16J 15/008 184/25 |
| 4,425,838 | A | 1/1984 | Pippert | |
| 4,566,372 | A | 1/1986 | Zandel et al. | |
| 4,577,363 | A | 3/1986 | Wyse | |
| 5,088,745 | A | 2/1992 | Peppiatt et al. | |
| 5,303,934 | A | 4/1994 | Elliott | |
| 5,513,556 | A | 5/1996 | Schaefer | |
| 6,609,716 | B2 | 8/2003 | Friend et al. | |
| 6,616,146 | B2 | 9/2003 | Friend et al. | |
| 8,408,862 | B1 | 4/2013 | Westendorf | |
| 8,424,150 | B1 | 4/2013 | Higgins et al. | |
| 10,648,566 | B2 | 5/2020 | Lyle et al. | |
| 11,067,105 | B1 | 7/2021 | Marquette et al. | |
| 11,698,062 | B2 * | 7/2023 | Feistel | F16J 15/26 417/228 |
| 2004/0206590 | A1 | 10/2004 | Harbu et al. | |
| 2005/0132878 | A1 | 6/2005 | Kucher et al. | |
| 2015/0096438 | A1 | 4/2015 | Subrt | |
| 2017/0108017 | A1 | 4/2017 | Van Gemert | |
| 2017/0260716 | A1 | 9/2017 | Dauderman et al. | |
| 2018/0128291 | A1 | 5/2018 | Sefcik et al. | |
| 2019/0309773 | A1 | 10/2019 | Sybrandy et al. | |
| 2022/0074400 | A1 * | 3/2022 | Zhou | F04B 39/0022 |
| 2022/0205545 | A1 | 6/2022 | Zatkoff et al. | |
| 2023/0228351 | A1 | 7/2023 | Belen et al. | |

OTHER PUBLICATIONS

International Search Report and Written Opinion of the ISA issued in PCT/US2025/018451, mailed May 14, 2025; ISA/US.

* cited by examiner

SYSTEM AND METHOD FOR PROTECTING A HYDRAULIC SYSTEM OF A WORK MACHINE

CROSS-REFERENCE TO RELATED APPLICATIONS

This application claims the benefit of U.S. Provisional Application No. 63/579,434, filed on Aug. 29, 2023. The entire disclosure of the above application is incorporated herein by reference.

FIELD

The present disclosure relates to a device for a work machine, and in particular to a device and method for protecting a hydraulic cylinder assembly of a work machine.

BACKGROUND

Work machines or vehicles, such as bulldozers, generally include hydraulic cylinder assemblies that are used to move one or more components of the machine for lifting or moving material in a work environment. Typical hydraulic cylinder assemblies include a piston rod that extends at least partially through a cylinder tube. The piston rod slides with respect to the tube between a first position, a second position, and positions therebetween, driving movement of the one or more components of the machine.

During operation of the machine in certain environments, like landfills or other locations in the waste industry, these hydraulic cylinders are exposed to debris (e.g., waste, garbage, mud, dirt, etc.). Flying debris, like plastic bags, may encounter the hydraulic cylinders, and there is a risk of such debris being sucked into the cylinders. This could lead to increased maintenance costs and machine downtime. The present disclosure provides a scraper assembly that may be removably installed onto a hydraulic cylinder to prevent or reduce debris from entering the hydraulic cylinder.

SUMMARY

This section provides a general summary of the disclosure and is not a comprehensive disclosure of its full scope or all of its features.

In one form, the present disclosure provides a hydraulic cylinder that includes a cylinder, a rod slidingly disposed in the cylinder, and a scraper assembly. The cylinder extends between a first end and a second end and includes a retention feature positioned adjacent to the first end. The scraper assembly circumscribes the rod and the cylinder. The scraper assembly includes a ring, a collar and a plate. The ring includes an outer surface and a radially spaced inner surface. The inner surface contacts a portion of the rod. The collar includes a first portion adjacent to a first surface contacting the outer surface of the ring and a second portion adjacent to a second surface contacting the retention feature of the cylinder. The plate contacts the first surface of the collar. The scraper assembly is removably installed onto the hydraulic cylinder.

In some configurations of the hydraulic cylinder of the above paragraph, the retention feature defines one or more notches.

In some configurations of the hydraulic cylinder of either of the above paragraphs, a first plurality of fasteners secure the plate to the collar. The first plurality of fasteners extend through each of the one or more notches of the retention feature. The first plurality of fasteners cooperate to limit rotation of the plate and the collar relative to the cylinder.

In some configurations of any of the above paragraphs, the first surface of the collar defines a plurality of apertures extending therethrough. A second plurality of fasteners are received in the plurality of apertures. The second plurality of fasteners cooperate to secure the plate to the collar.

In some configurations of any of the above paragraphs, the ring extends between a first surface and an axially spaced second surface. A step extends radially inward from the inner surface and is positioned between the first surface of the ring and the second surface of the ring. A first portion of the ring is defined between the first surface and the step. A second portion of the ring is defined between the step and the second surface.

In some configurations of any of the above paragraphs, one of the first portion and the second portion of the ring contacts the rod and the other of the first portion and the second portion is spaced apart from the rod.

In some configurations of any of the above paragraphs, the first surface of the ring contacts the plate, the second surface of the ring contacts the collar, and the second portion of the ring contacts the rod.

In some configurations of any of the above paragraphs, the first surface of the ring contacts the collar, the second surface of the ring contacts the plate, and the second portion of the ring contacts the rod.

In some configurations of any of the above paragraphs, the scraper assembly further includes a seal.

In some configurations of any of the above paragraphs, the seal includes an outer surface and an inner surface spaced radially inward from the outer surface. The outer surface of the seal contacts a third portion of the collar. The inner surface of the seal contacts the rod.

In some configurations of any of the above paragraphs, the ring is formed of a metallic material.

In some configurations of any of the above paragraphs, the ring is formed of bronze, copper, alloys thereof, and combinations thereof.

In some configurations of any of the above paragraphs, the ring includes a first semi-circular ring and a second semi-circular ring.

In some configurations of any of the above paragraphs, the plate includes a first semi-circular plate and a second semi-circular plate.

In some configurations of any of the above paragraphs, the collar includes a first semi-circular collar and a second semi-circular collar.

In another form, the present disclosure provides a hydraulic cylinder for a work vehicle including a cylinder, a rod slidingly disposed in the cylinder and a scraper assembly. The cylinder extends between a first end and a second end. A retention feature is positioned adjacent to the first end. The scraper assembly includes a first semi-circular ring and a second semi-circular ring contacting the first semi-circular ring. The first semi-circular ring and the second semi-circular ring circumscribe and contact a portion of the rod. The scraper assembly includes a first semi-circular collar and a second semi-circular collar contacting the first semi-circular collar. A first portion of the first semi-circular collar and the second semi-circular collar contact the retention feature of the cylinder. A second portion of the first semi-circular collar and the second semi-circular collar contact the first semi-circular ring and the second semi-circular ring. The scraper assembly includes a first semi-circular plate and a second semi-circular plate contacting the first semi-circular collar. The first semi-circular plate and the second semi-circular plate circumscribe the rod. The first semi-circular collar, the second semi-circular collar, the first semi-circular plate, and the second semi-circular plate cooperate to radially compress the first semi-circular ring and the second semi-circular ring against the rod.

In some configurations of the above paragraph, the first semi-circular plate contacts both of the first semi-circular collar and the second semi-circular collar. The second semi-circular plate contacts both the first semi-circular collar and the second semi-circular collar.

In some configurations of either of the above paragraphs, the scraper assembly includes a first semi-circular seal and a second semi-circular seal. The first semi-circular collar, the second semi-circular collar, the first semi-circular plate, and the second semi-circular plate cooperate to radially compress the first semi-circular seal and the second semi-circular seal against the rod.

In another form, the present disclosure provides a method of assembling a scraper assembly onto a hydraulic cylinder. The method includes attaching at least two scraper ring pieces around a rod; attaching at least two collar pieces around a cylinder and the at least two scraper ring pieces; attaching at least two plate pieces around the rod; inserting a first plurality of bolts and a second plurality of bolts through the at least two plate pieces and the at least two collar pieces; and tightening the first plurality of bolts and the second plurality of bolts.

In some configurations of the above paragraph, the method further includes, prior to the attaching of the at least two collar pieces, attaching at least two scraper seal pieces around the rod.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
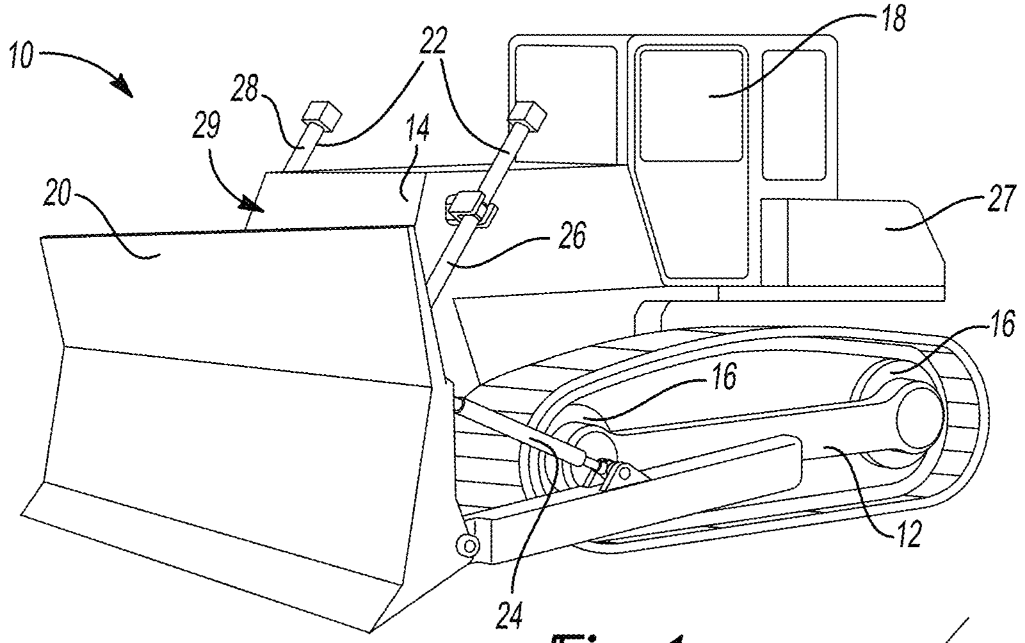
FIG. 1 is a schematic of a work machine having a hydraulic cylinder including a scraper assembly according to the principles of the present disclosure.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

With reference to FIG. 1, a work vehicle 10 (e.g., a work machine) is provided. The work vehicle 10 shown in the figures is a bulldozer. However, it will be appreciated that the principles of the present disclosure are applicable to other types of work vehicles and machines such as those used in waste management, construction, mining, or transportation industries. Moreover, the present disclosure is applicable to other types of machines including one or more moving rods, hydraulic cylinders, and/or joints that are susceptible to debris ingression.

The work vehicle 10 may include a vehicle frame or chassis 12, a body 14 mounted to the chassis 12, a plurality of wheels 16 supported by the chassis 12, a drive system (not shown), an operator cab 18, and a blade 20. The blade 20 may be movably connected to the body 14 via a first set of hydraulic cylinders 22 (also referred to as the “first hydraulic cylinder assembly 22”). Additionally or alternatively, the blade 20 may be movably coupled to the chassis 12 via a second set of hydraulic cylinders 24 (also referred to as the “second hydraulic cylinder assembly 24”). The first set of hydraulic cylinders 22 includes a first hydraulic cylinder 26 mounted to a first side 27 of the work vehicle 10 and a second hydraulic cylinder 28 mounted to a second side 29 of the work vehicle 10. The first set of hydraulic cylinders 22 and the second set of hydraulic cylinders 24 cooperate to move the blade 20 in one or more directions during operation of the work vehicle 10. For example, the blade 20 may be movable in a first (e.g., up/down) direction, second (e.g., fore/aft) direction, a third (e.g., tilted in plane) direction, and optionally a fourth (e.g., swiveled) direction to clear and/or relocate waste, rubble, dirt, etc.

Figure 2:
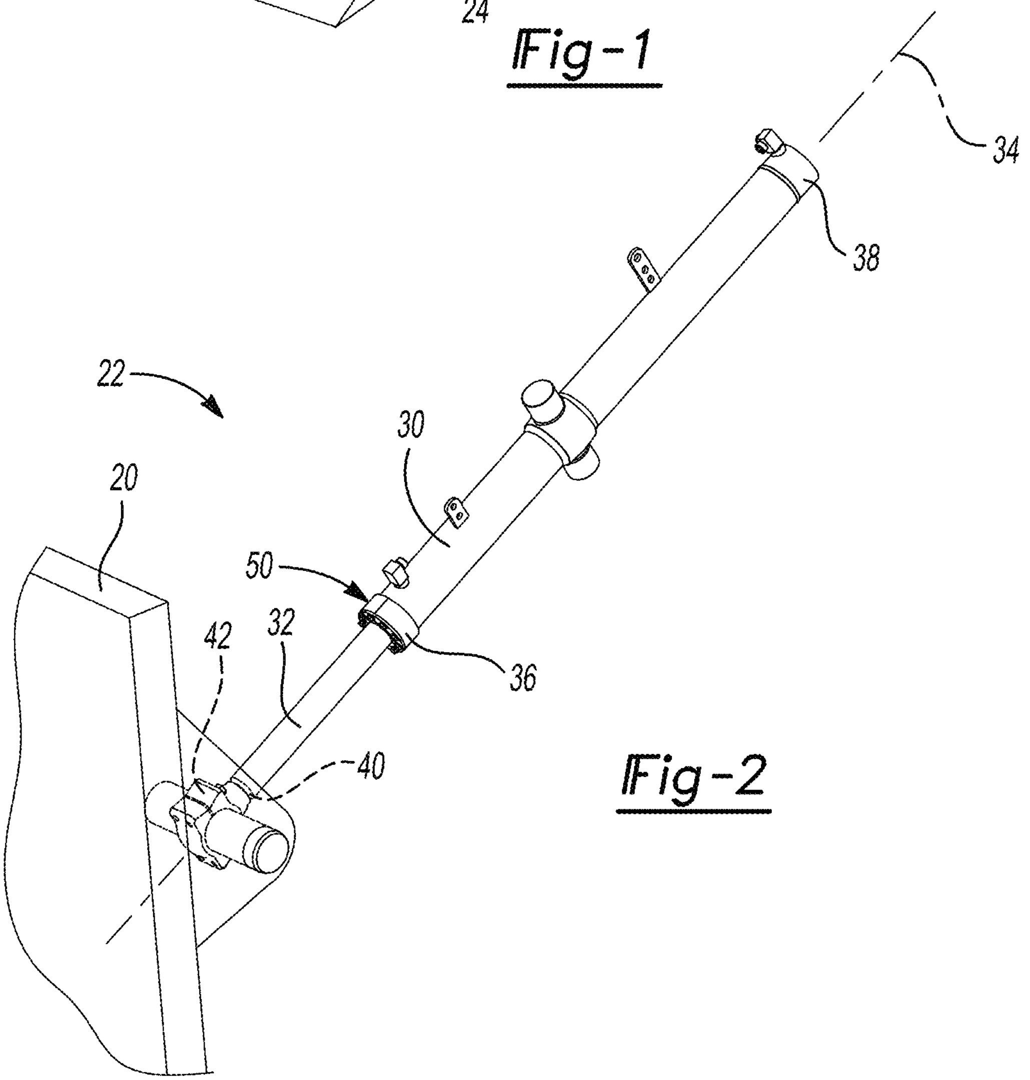
FIG. 2 is a perspective view of the hydraulic cylinder of FIG. 1.
Figure 3:
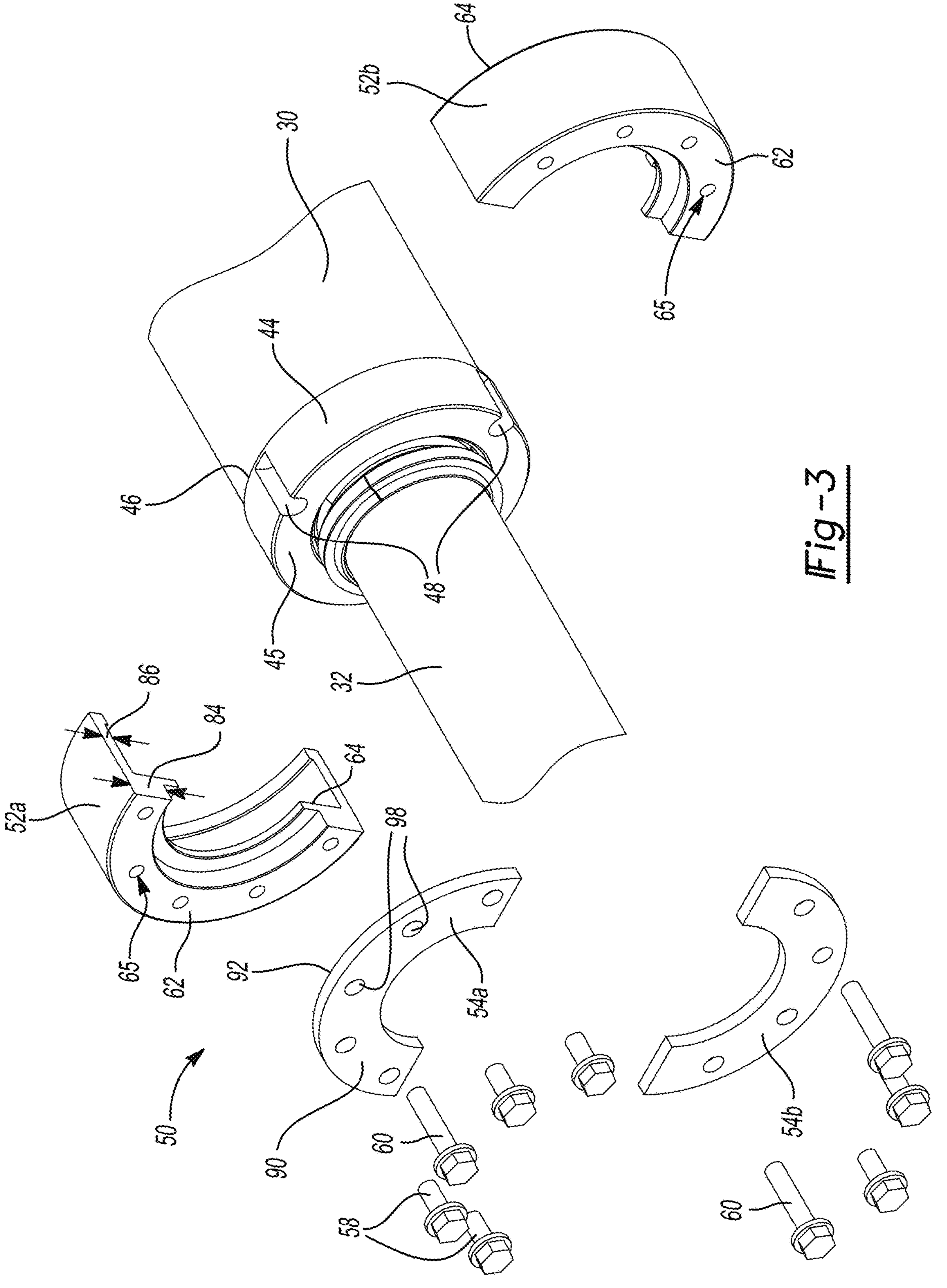
FIG. 3 is a partially exploded view of a portion of the hydraulic cylinder of FIG. 2.
Figure 4:
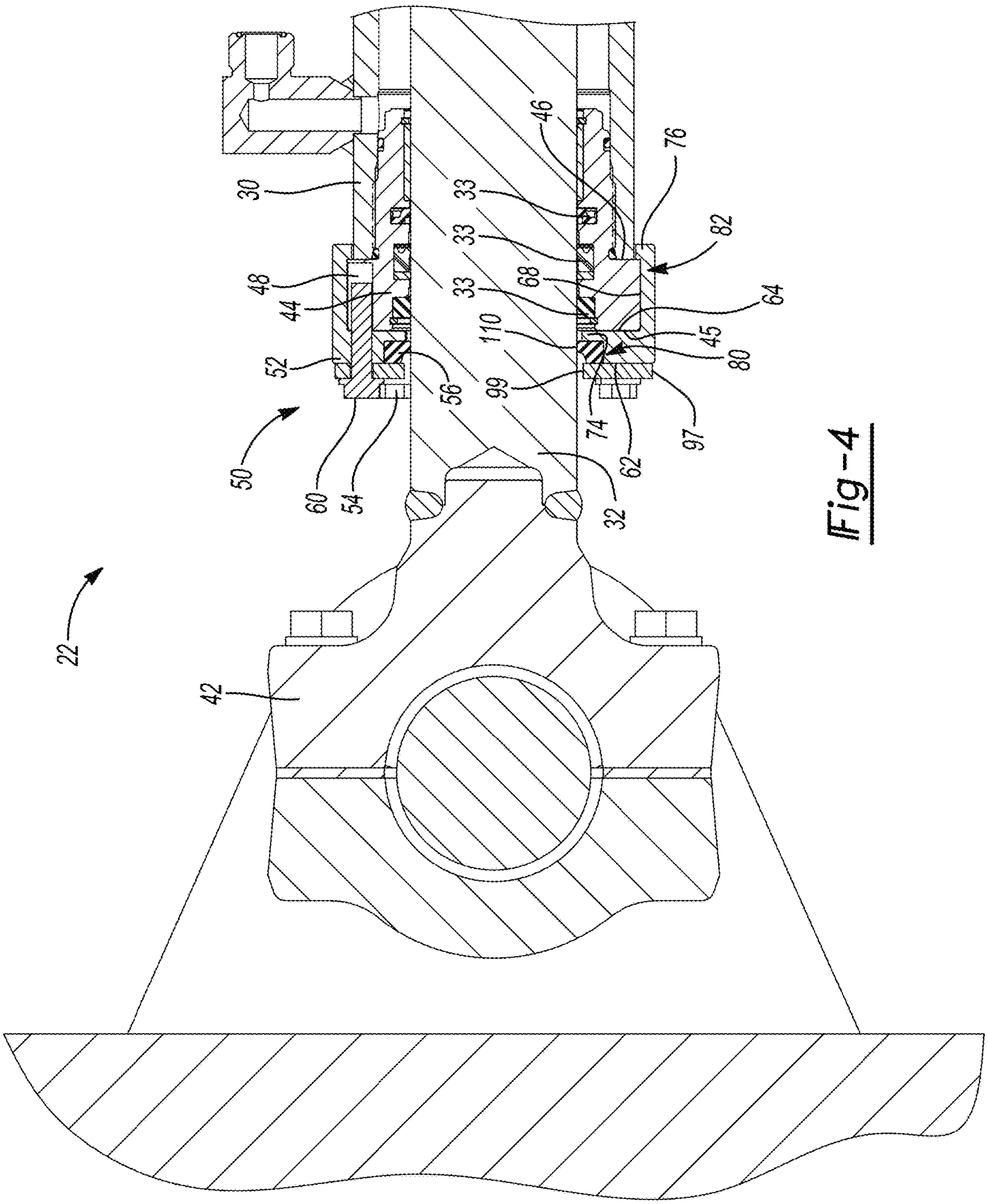
FIG. 4 is a cross-sectional view of the hydraulic cylinder of FIG. 2 including a scraper assembly taken along line A-A of FIG. 2.

With reference to FIGS. 2-4, the first hydraulic cylinder assembly 22 is shown. While FIG. 2-4 show only the first hydraulic cylinder assembly 22, it is to be understood that the second hydraulic cylinder assembly 24 may also include the features described below for the hydraulic cylinder assembly 22. The hydraulic cylinder assembly 22 includes a cylinder 30 (e.g., a pressure tube), a movable piston rod 32 (i.e., the “rod 32”), a piston assembly (not shown), and one or more seals 33 (FIGS. 4 and 7) circumscribing the rod 32. The cylinder 30 extends axially along a longitudinal axis 34 from a first end 36 to a second end 38. The piston assembly is slidably disposed within the cylinder 30. The rod 32 extends axially along the axis 34 from a first end 40 connected to an attachment body 42 (e.g., a rod eye) and a second end (not shown) connected to the piston assembly. At least a portion of the rod 32 is slidably disposed within the cylinder 30 and movable between a first position (e.g., a fully retracted position), a second position (e.g., a fully extended position), and a plurality of positions therebetween.

The cylinder 30 is fixed to the body 14 of the vehicle 10. For example, the cylinder 30 may be fixed via one or more fasteners (e.g., nuts, bolts, rivets, ties), brackets, or links. The rod 32 may be fixed (e.g., rotatably fixed) to the blade 20 of the vehicle 10, such as via the attachment body 42.

As best shown in FIG. 3, the first end 36 of the cylinder 30 may include a lip or retention feature 44. The retention feature 44 may be integrally formed with the cylinder 30. Alternately, the retention feature 44 may be joined (e.g., fastened) to the cylinder 30. The retention feature 44 may project radially outward from the cylinder 30 such that a diameter of the retention feature 44 is greater than a diameter of the cylinder 30. The retention feature 44 extends between a first surface 45 and an axially spaced second surface 46. While FIG. 3 shows the retention feature 44 circumscribing the entire cylinder 30, it is contemplated that alternate embodiments the retention feature 44 extends from only a portion cylinder 30 (e.g., the retention feature 44 may include one or more radially extending protrusions).

The retention feature 44 defines one or more grooves or notches 48. The notches may extend from the first surface 45 towards the second surface 46. The notches 48 may have a generally semi-circular shape, although other shapes and configurations are contemplated. The notches 48 are configured to receive fasteners therein (see, e.g., the first plurality of fasteners 60). In the configuration shown in FIG. 3, the retention feature 44 includes two notches 48 that are spaced apart around the retention feature 44. For example, each of the notches 48 may be spaced apart at an angle of about 180 degrees. It is contemplated that the retention feature 44 may include more or less than two notches 48 and/or notches 48 positioned at different spacings around the retention feature 44. For example, the retention feature 44 may include four notches 48 spaced apart at an angle of about 90 degrees. In another example, the retention feature 44 may include three notches 48 spaced apart at an angle of about 60 degrees.

A scraper assembly 50 is removably installed onto the hydraulic cylinder assembly 22 at or near the first end 36 of the cylinder 30. As will be described in greater detail below, when installed, the scraper assembly 50 is fixed to and circumscribes the cylinder 30 and the rod 32. The scraper assembly is configured to prevent debris (e.g., plastic bags, garbage, waste, etc.) from entering the cylinder 30, thereby reducing the amount of debris trapped in the cylinder 30.

Referring to FIGS. 3-6B, the scraper assembly 50 includes a collar 52, a plate 54, and a scraper ring 56. The scraper assembly 50 may also include a first plurality of fasteners 60 (e.g., bolts, nuts, rivets, ties, brackets, links, adhesives, etc.) and a second plurality of fasteners 58 (e.g., bolts, nuts, rivets, ties, brackets, links, adhesives, etc.). In one example, the first plurality of fasteners 60 are bolts having a first length and the second plurality of fasteners 58 are bolts having a second length that is less than the first length.

Each of the collar 52, the plate 54, and the scraper ring 56 include at least two distinct pieces that are joined or coupled together during assembly. In this way, the scraper assembly 50 may be removably installed to the hydraulic cylinder assembly 22 after the assembly of the work vehicle 10 (e.g., by retrofitting at a dealership or after-market facility), thereby eliminating or reducing the additional work required to service and retrofit the hydraulic cylinder assembly 22 to install a scraper assembly. For example, the scraper assembly 50 may be installed and/or removed from the hydraulic cylinder assembly 22 without disassembling the hydraulic cylinder assembly 22. It follows that the scraper assembly 50 including the collar 52, plate 54, and scraper ring 56, each having at least two pieces, facilitates efficient and cost-effective assembly onto and removal from the hydraulic cylinder assembly 22 compared to conventional assemblies.

The collar 52 may be formed of a metallic material, a polymeric material, or a composite material. The collar 52 includes a first collar 52*a* (e.g., a first semi-circular collar) and a second collar 52*b* (e.g., a second semi-circular collar) (collectively the "collars 52*a*, 52*b*"). Each of the collars 52*a*, 52*b* extends between a first surface 62 and an axially spaced second surface 64. The first surface 62 defines a plurality of apertures 65 extending therethrough. Each of the collars 52*a*, 52*b* includes an outer surface 66 and an inner surface 68 spaced radially inward from the outer surface 66. Each of the collars 52*a*, 52*b* may extend in a semi-circular shape between a first end 70 and a second end 72. A first step or flange 74 extends radially inward from the inner surface 68 and is positioned between the first surface 62 and the second surface 64. A second step or flange 76 extends radially inward from the inner surface 68 and is positioned adjacent to the second surface 64. The first step or flange 74 defines a first or ring engaging portion 80 (FIG. 4) between the first surface 62 and the step 74 and a second or cylinder engaging portion 82 between the step 74 and the second surface 64. A first thickness 84 (FIG. 3) of the ring engaging portion 80 is greater than a second thickness 86 of the cylinder engaging portion 82 such that a first dimension (e.g., a first diameter) of the ring engaging portion 80 is less than a second dimension (e.g., a second diameter) of the cylinder engaging portion 82.

When installed, the first collar 52*a* and the second collar 52*b* cooperate to circumscribe the cylinder 30 and rod 32. Specifically, the first end 70 of the first collar 52*a* abuts and contacts the first end 70 of the second collar 52*b* and the second end 72 of the first collar 52*a* abuts and contacts the second end 72 of the second collar 52*b*. As best shown in FIG. 4, the first step 74 of each of the collars 52*a*, 52*b* engages the first surface 45 of the retention feature 44. The first step 74 is slightly spaced apart from the rod 32 (e.g., in a radial direction), defining a gap therebetween. The second step 76 of each of the collars 52*a*, 52*b* engages the second surface 46 of the retention feature 44. The inner surface 68 of the cylinder engaging portion 82 of the collars 52*a*, 52*b* may contact the retention feature 44.

The plate 54 may be formed of a metallic, polymeric, or composite material. The plate 54 includes a first plate 54*a* (e.g., a first semi-circular plate) and a second plate 54*b* (e.g., a second semi-circular plate) (collectively the "plates 54*a*, 54*b*"). Each of the plates 54*a*, 54*b* extend between a first surface 90 and an axially spaced second surface 92. The plates 54*a*, 54*b* extend in a semi-circular shape between a first end 94 and a second end 96. The plates 54*a*,54*b* include an outer surface 97 and an inner surface 99 spaced radially inward from the outer surface 97. The plates 54*a*, 54*b* define a plurality of apertures 98 extending between the first surface 90 and the second surface 92.

When installed, the first plate 54*a* and the second plate 54*b* cooperate to circumscribe the rod 32. Specifically, the first end 94 of the first plate 54*a* abuts and contacts the first end 94 of the second plate 54*b* and the second end 96 of the first plate 54*a* abuts and contacts the second end 96 of the second plate 54*b*. As best shown in FIG. 4, the inner surface 99 of the plates 54*a*, 54*b* is slightly spaced apart from (i.e., provides a clearance or gap to) the rod 32.

Figure 5A:
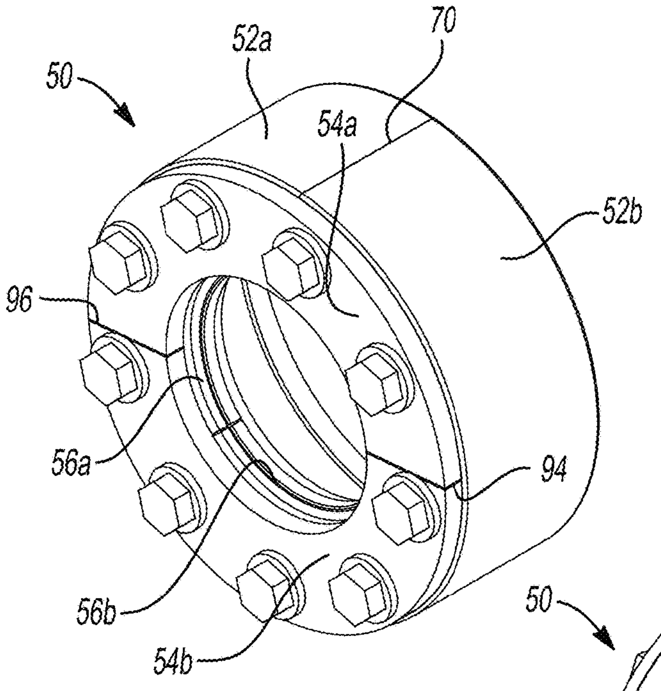
FIG. 5A is a front perspective view of the scraper assembly of FIG. 4.
Figure 5B:
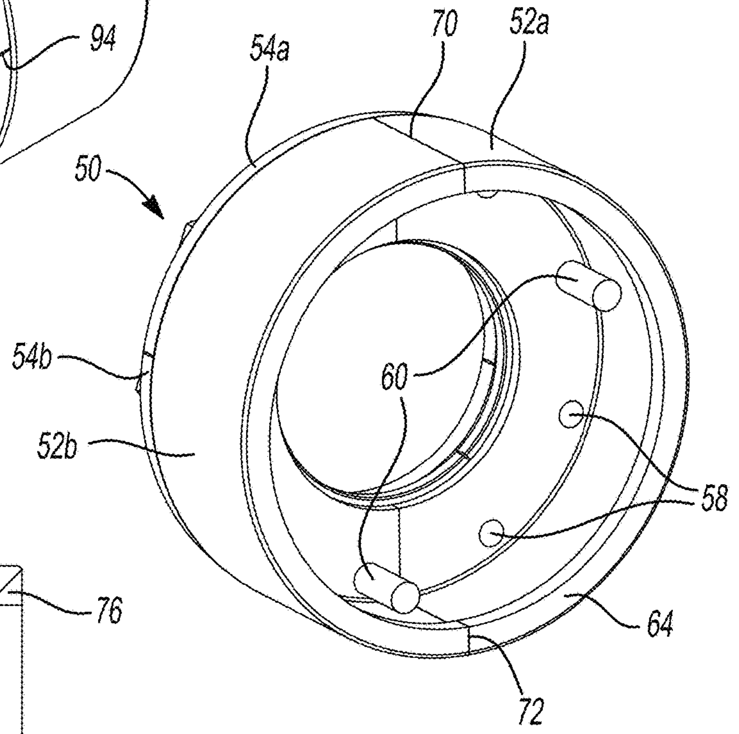
FIG. 5B is a rear perspective view of the scraper assembly of FIG. 4.
Figure 5C:
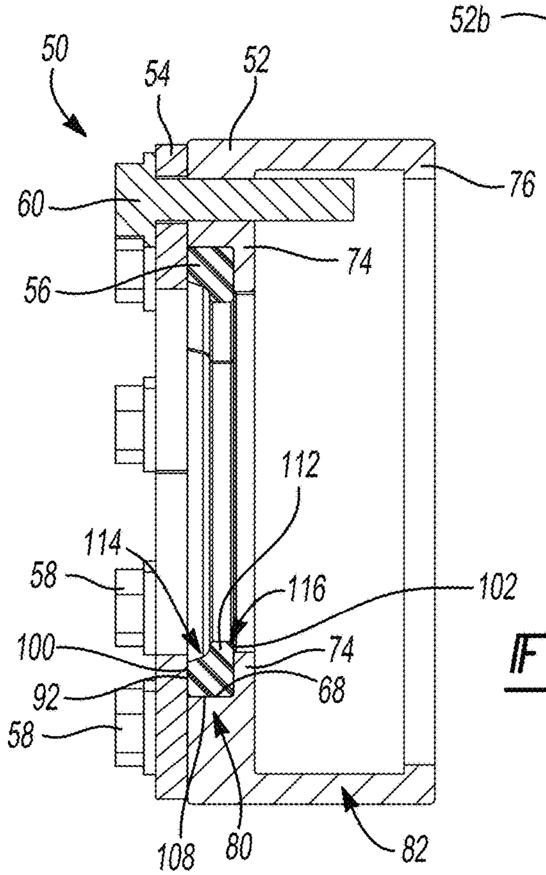
FIG. 5C is a cross-sectional view of the scraper assembly of FIGS. 5A-5B taken along line 5C-5C of FIGS. 5A and 5B.

As best shown in FIGS. 5A-5B, the joined ends 94, 96 of the plates 54*a*, 54*b* are offset from the joined ends 70, 72 of the collars 52*a*, 52*b*. In the configuration shown in FIGS. 3-6B, the offset is about 90 degrees. In this way, the second surface 92 of the first plate 54*a* contacts both the first surface 62 of the first collar 52*a* and the first surface 62 of the second collar 52*b*. Similarly, the second surface 92 of the second plate 54*b* contacts both the first surface 62 of the first collar 52*a* and the first surface 62 of the second collar 52*b*.

The plurality of apertures 98 of the plates 54*a*, 54*b* are aligned with the plurality of apertures 65 of the collars 52*a*, 52*b*. The second plurality of fasteners 58 are received in a portion of the apertures 95, 98 to secure and retain the plates 54*a*, 54*b* to the collars 52*a*, 52*b* and thereby retain the collars 52*a*, 52*b* to the cylinder 30.

At least two of the plurality of apertures 98 of the plates 54*a*, 54*b* are aligned with the notches 48 of the retention feature 44. The first plurality of fasteners 60 are received in the apertures 98 and the notches 48. The first plurality of fasteners 60 retain the plates 54*a*, 54*b* and collars 52*a*, 52*b* to the cylinder 30 and also reduce rotation of the plates 54*a*, 54*b* and/or collars 52*a*, 52*b* during operation of the hydraulic cylinder assembly 22. It is contemplated that some rotational movement of the collar may be permitted to reduce stress during operation and prevent mechanical failure.

The scraper ring 56 is formed of a metallic material. The metallic material may include brass, copper, zinc, lead, tin, manganese, nickel, iron, alloys thereof, and/or combinations thereof. The scraper ring 56 is configured to prevent or inhibit debris from entering the cylinder by contacting or "scraping" the rod 32 as it moves between its fully extended and fully retracted positions. As such, the scraper ring 56 must exhibit a hardness, strength, and durability sufficient to effectively remove debris from the rod 32 while minimizing wear (e.g., scratching) of the rod 32.

Figure 6A:
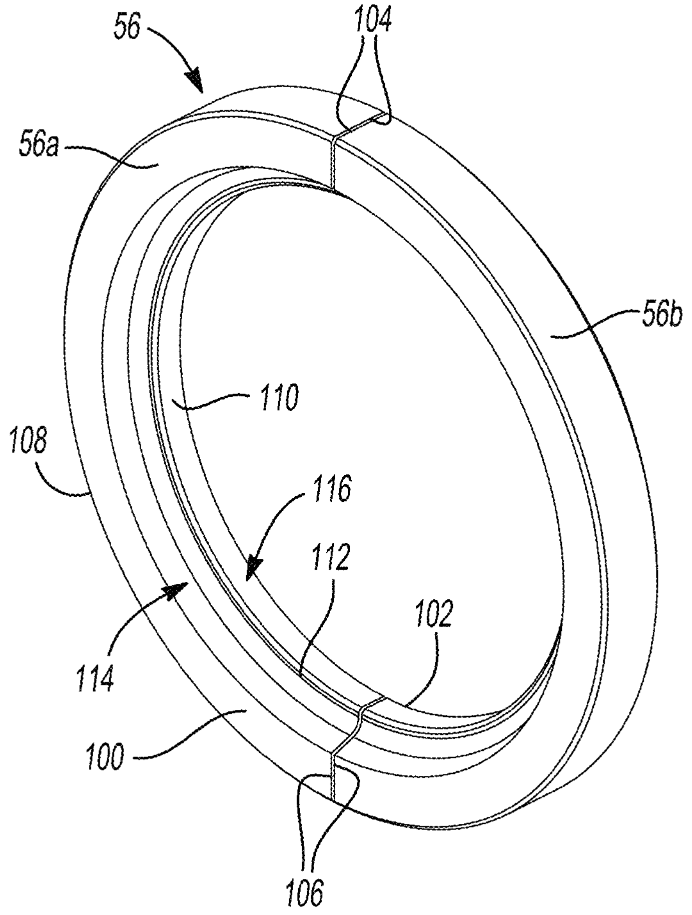
FIG. 6A is a front perspective view of a scraper ring of the scraper assembly of FIGS. 4 and 5A-5C.
Figure 6B:
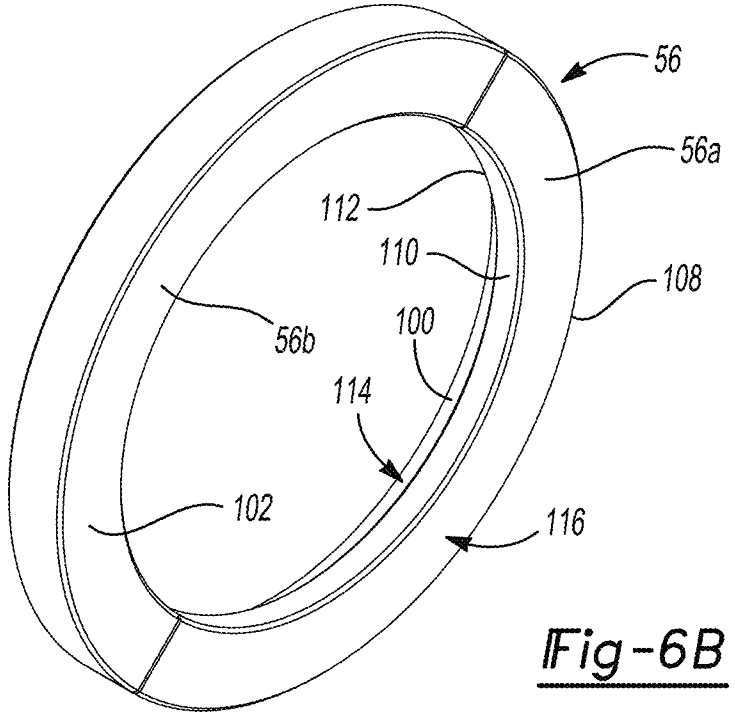
FIG. 6B is a rear perspective view of the scraper ring of FIG. 6A.

Referring to FIGS. 6A and 6B, the scraper ring 56 includes a first ring 56*a* (e.g., a first semi-circular ring) and a second ring 56*b* (e.g., a second semi-circular ring) (collectively the "rings 56*a*, 56*b*"). Each of the rings 56*a*, 56*b* extend between a first surface 100 and an axially extending spaced second surface 102. The rings 56*a*, 56*b* extend in a semi-circular shape between a first end 104 and a second end 106. The rings 56*a*, 56*b* include an outer surface 108 and an inner surface 110. A flange or step 112 extends radially inward from the inner surface 110 and is positioned between the first surface 100 and the second surface 102. The step 112 defines a first or cavity portion 114 between the first surface 100 and the step 112 and a second or rod engaging portion 116 between the step 112 and the second surface 102. A first thickness of the cavity portion 114 is less than a second thickness of the rod engaging portion 116 such that a first dimension (e.g., a first diameter) of the cavity portion 114 is greater than a second dimension (e.g., a second diameter) of the rod engaging portion 116.

With renewed reference to FIGS. 4 and 5A-5C, when installed, the first ring 56*a* and the second ring 56*b* cooperate to circumscribe the rod 32. Specifically, the first end 104 of the first ring 56*a* abuts and contacts the first end 104 of the second ring 56*b* and the second end 106 of the first ring 56*a* abuts and contacts the second end 106 of the second ring 56*b*.

The collar 52 and the plate 54 cooperate to retain the scraper ring 56 around the rod 32. Specifically, the collar 52 and the plate 54 cooperate to compress the scraper ring 56 radially inward around the rod 32. The scraper ring 56 is positioned within the ring engaging portion 80 of the collar 52 such that the inner surface 68 of the collar 52 contacts the outer surface 108 of the scraper ring 56 (see, e.g., FIG. 5C). The first surface 100 of the scraper ring 56 contacts the second surface 92 of the plate 54. The second surface 102 of the scraper ring 56 contacts the step 74 of the collar 52. The inner surface 110 of the rod engaging portion 116 contacts the rod 32. The inner surface 110 of the cavity portion 114 is spaced apart from the rod 32, defining a gap therebetween (see, e.g., FIG. 4).

As the rod 32 moves between the first (e.g., fully extended) position and the second (e.g., fully retracted) position, debris may attach to the rod 32. The scraper ring 56, which is retained in position by the collar 52 and the plate 54, contacts the rod 32. The plate 54 and the collar 52 cooperate to radially compress the scraper ring 56 against the rod 32. The interference between the scraper ring 56 and the rod 32 prevents debris from entering into the cylinder 30 and/or building up on the rod 32. Thus, the hydraulic cylinder assembly 22 is less likely to require maintenance during its life cycle as compared to a hydraulic cylinder assembly that is free of a scraper assembly. Retaining the scraper ring 56 in this manner axially restrains the scraper ring 56 and limits deformation that may result from movement of the rod 32 during operation.

With reference to FIGS. 7-9B, the hydraulic cylinder assembly 22 including the cylinder 30 and rod 32 is shown including a scraper assembly 150. The scraper assembly 150 may be the same as or similar to the scraper assembly 50 of FIGS. 3-6B, except as otherwise described below. The scraper assembly 150 includes a collar 152, the plate 54, the scraper ring 56, and a scraper seal 158.

Figure 8A:
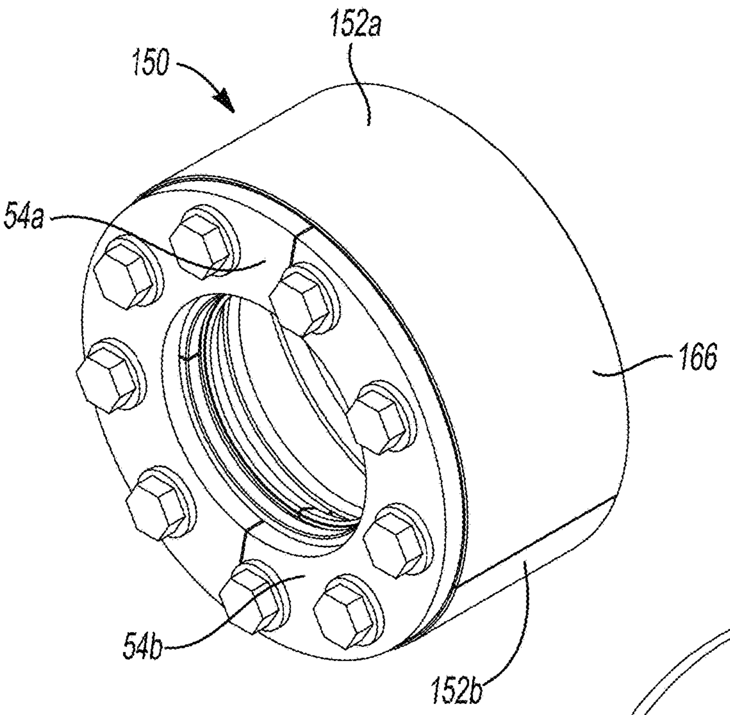
FIG. 8A is a front perspective view of the scraper assembly of FIG. 7.
Figure 8B:
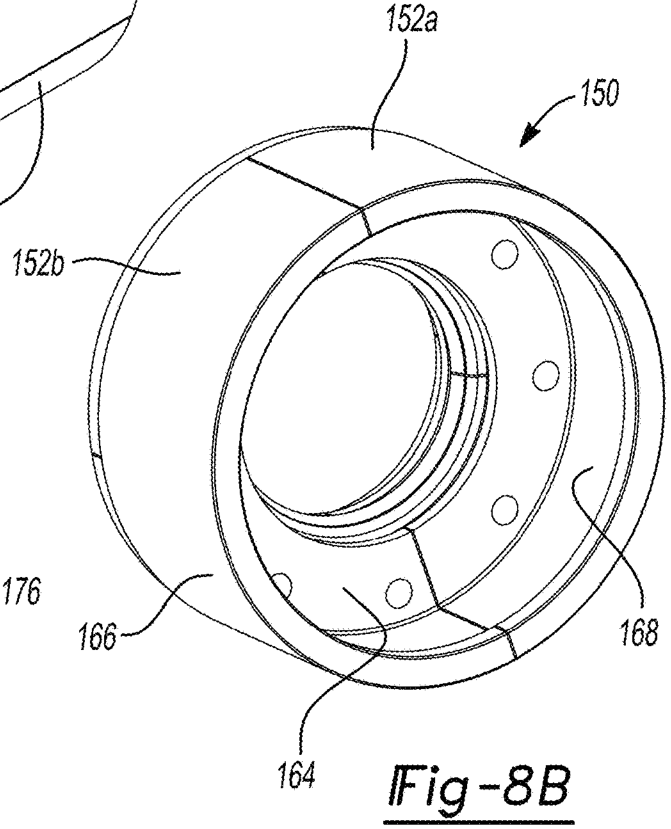
FIG. 8B is a rear perspective view of the scraper assembly of FIG. 7.
Figure 8C:
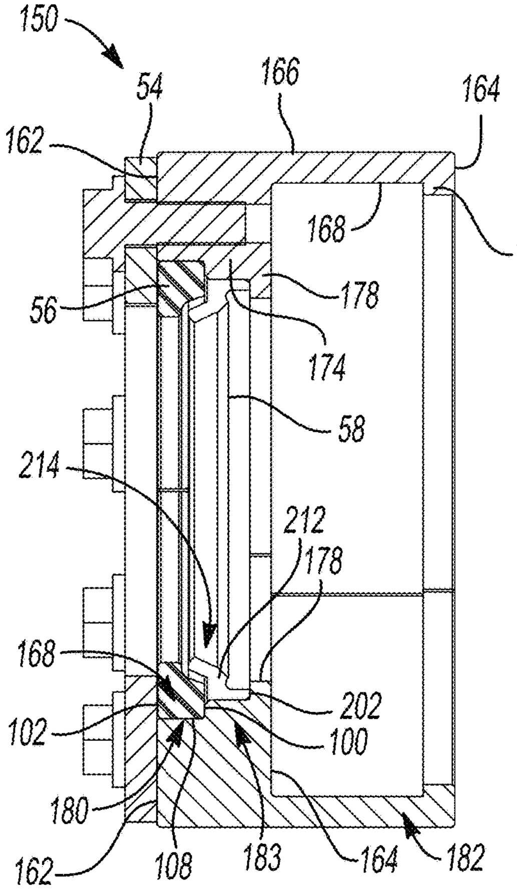
FIG. 8C is a cross-sectional view of the scraper assembly of FIGS. 8A-8B taken along line 8C-8C of FIGS. 8A and 8B.

As best shown in FIG. 8C, the collar 152 includes a first collar 152*a* (e.g., a first semi-circular collar) and a second collar 152*b* (e.g., a second semi-circular collar) (collectively the "collars 152*a*, 152*b*"). Each of the collars 152*a*, 152*b* extends between a first surface 162 and an axially spaced second surface 164. The first surface 162 defines a plurality of apertures (not shown) extending therethrough. The collars 152*a*, 152*b* include an outer surface 166 and an inner surface 168 spaced radially inward from the outer surface 166. Each of the collars 152*a*, 152*b* may extend in a semi-circular shape between a first end 170 and a second end 172. A first step or flange 174 extends radially inward from the inner surface 168 and is positioned between the first surface 162 and the second surface 164. A second step or flange 176 extends radially inward from the inner surface 168 and is positioned adjacent to the second surface 164. A third step or flange 178 extends radially inward from the inner surface 168 and is positioned between the first step 174 and the second step 176. A first or ring engaging portion 180 is defined between the first surface 162 and the first step 160. A second or cylinder engaging portion 182 is defined between the second step 176 and the third step 178. A third or seal engaging portion 183 is defined between the first step 174 and the second step 176.

Figure 7:
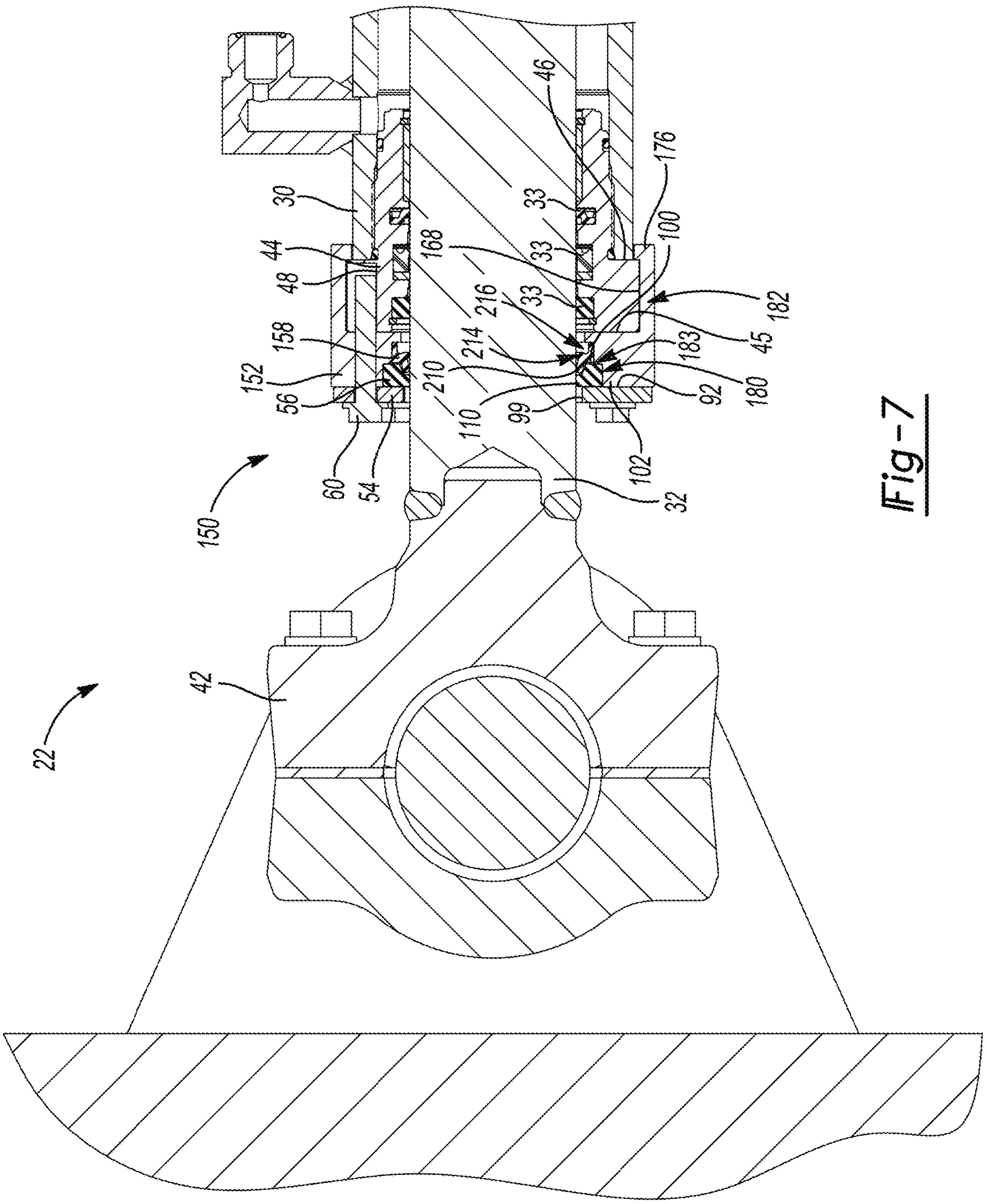
FIG. 7 is a cross-sectional view of the hydraulic cylinder of FIG. 2 including another scraper assembly taken along line A-A of FIG. 2.

As best shown in FIG. 7, when installed, the third step 178 of each of the collars 152*a*, 152*b* engages the first surface 45 of the retention feature 44. The third step 178 is slightly spaced apart from the rod 32 (e.g., in a radial direction), defining a gap therebetween. The first step 174 is also spaced apart from the rod 32, defining a gap therebetween. The second step 176 of each of the collars 152*a*, 152*b* engages the second surface 46 of the retention feature 44. The inner surface 168 of the cylinder engaging portion 182 of the collars 152*a*, 152*b* may contact the retention feature 44.

Figure 9A:
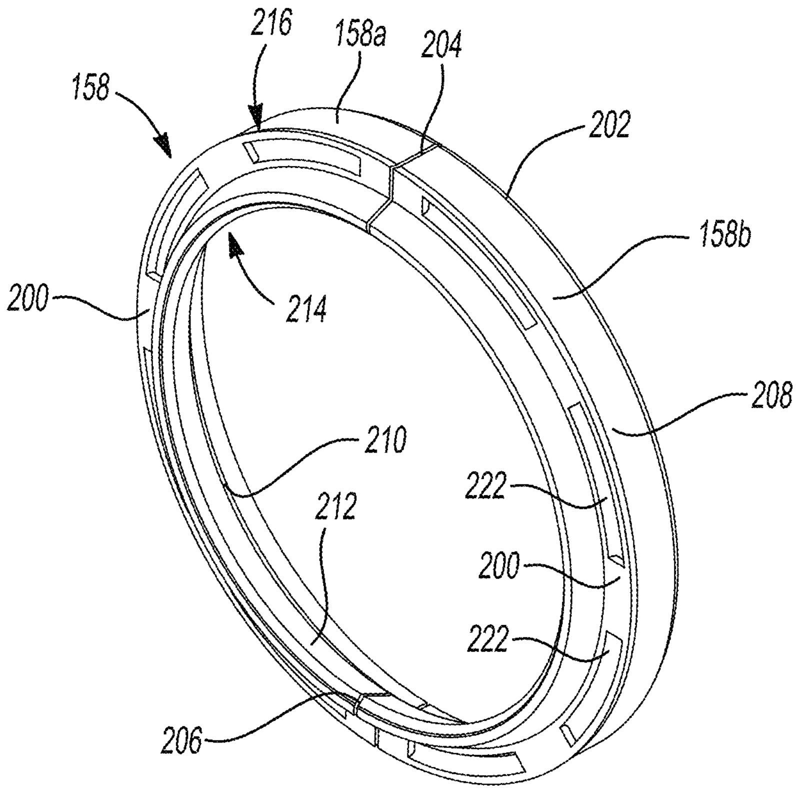
FIG. 9A is a front perspective view of a seal of the scraper assembly of FIGS. 7 and 8A-8C.
Figure 9B:
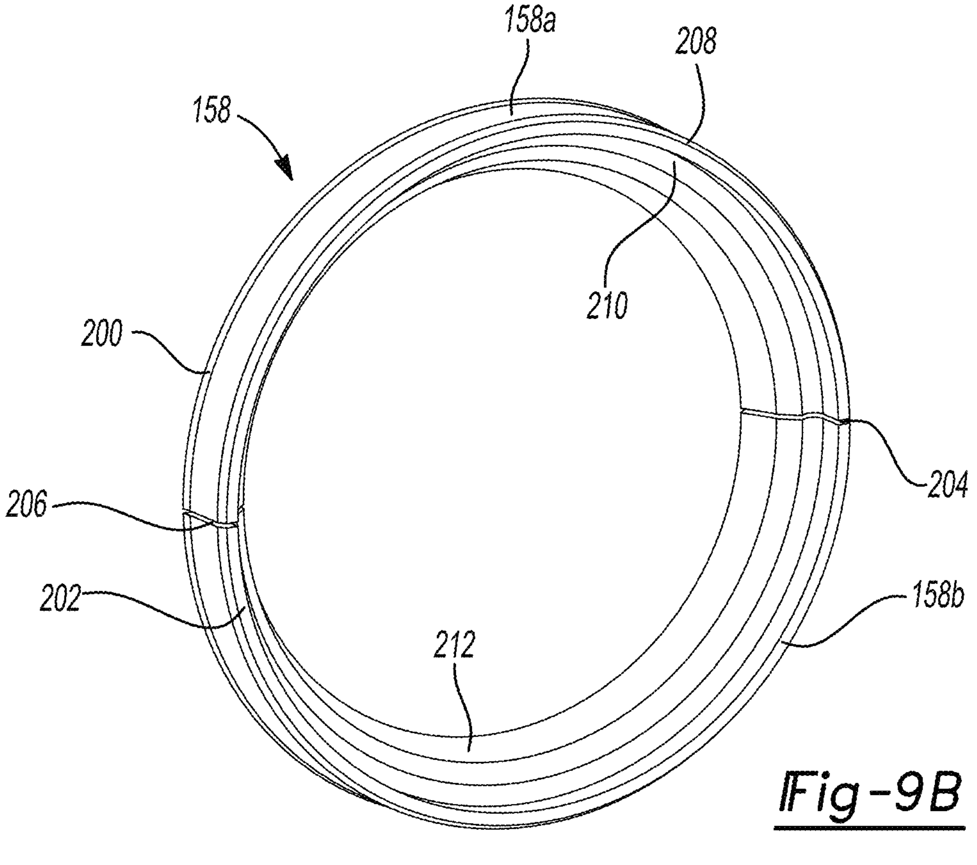
FIG. 9B is a rear perspective view of the seal of FIG. 9A.

Referring to FIGS. 9A-9B, the scraper seal 158 includes a first seal 158*a* (e.g., a first semi-circular seal) and a second seal 158*b* (e.g., a second semi-circular seal) (collectively the "seals 158*a*, 158*b*"). Each of the seals 158*a*, 158*b* extend between a first surface 200 and an axially spaced second surface 202. The seals 158*a*, 158*b* extend in a semi-circular shape between a first end 204 and a second end 206. The seals 158*a*, 158*b* include an outer surface 208 and an inner surface 210. A flange or step 212 extends radially inward from the inner surface 210 and is positioned between the first surface 200 and the second surface 202. The step 212 defines a first portion 214 between the first surface 200 and the step 212 and a second portion 216 between the step 212 and the second surface 202. Each of the outer surface 208 and inner surface 210 of the first portion 214 extend to the first surface 200 at an angle (i.e., the first portion 214 is chamfered). A surface 220 of the step 212 defines a plurality of grooves 222 therein. The plurality of grooves 222 are spaced circumferentially around the step 212.

When installed, the first seal 158*a* and the second seal 158*b* cooperate to circumscribe the rod 32. Specifically, the first end 204 of the first seal 158*a* abuts and contacts the first end 204 of the second seal 158*b*. The second end 206 of the first seal 158*a* abuts and contacts the second end 206 of the second seal 158*b*.

The collar 52 and the plate 54 cooperate to retain the scraper ring 56 and the scraper seal 158 around the rod 32. At least a portion of the scraper ring 56 and the scraper seal 158 contact the rod 32 to prevent debris from entering the cylinder 30.

The scraper ring 56 is positioned within the ring engaging portion 180 of the collar 152. The scraper ring 56 of the scraper assembly 150 is oriented in the opposite direction as compared to the scraper ring 56 of the scraper assembly 50. In other words, in the configuration of FIGS. 7-9B, the scraper ring 56 is flipped about 180 degrees relative to its orientation in the scraper assembly 50. In this way, the second surface 102 of the scraper ring 56 abuts and contacts the second surface 92 of the plate 54 and the first surface 100 of the scraper ring 56 contacts the first step 174 of the collar 152. The inner surface 168 of the collar contacts the outer surface 108 of the scraper ring 156.

The scraper seal 158 is positioned within the seal engaging portion 183 of the collar 152. The second surface 202 of the scraper seal 158 abuts and contacts the third step 178 of the collar 152. The scraper seal 158 at least partially engages the scraper ring 56. Specifically, the first surface 100 of the scraper ring 56 contacts the surface 220 of the step 212 of the scraper seal 158. Additionally, the inner surface 110 of the cavity portion 114 of the scraper ring 56 contacts the outer surface 208 of the first portion 214 of the scraper seal 158. The inner surface 110 of the cylinder engaging portion 116 of the scraper ring 56 and the inner surface 210 of the first portion 214 of the scraper seal 158 contact the rod 32.

Figure 10:
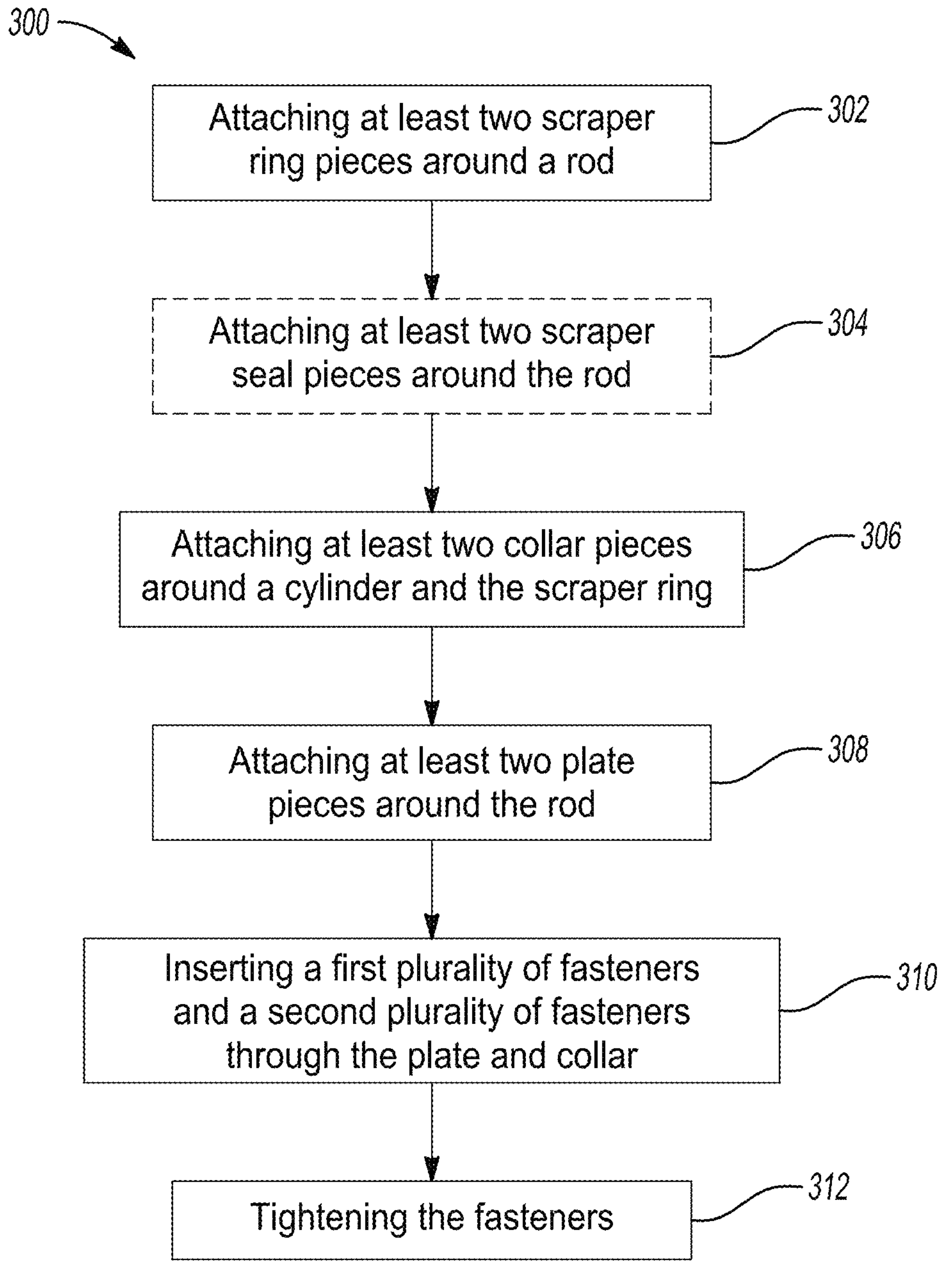
FIG. 10 is a flowchart of a method of installing a scraper assembly onto the hydraulic cylinder.

With reference to FIG. 10, a method 300 of assembling a scraper assembly onto a hydraulic cylinder assembly is provided. The hydraulic cylinder assembly includes a cylinder and a movable rod. At 302, the method 300 includes attaching at least two scraper ring pieces around the rod. The attaching may include positioning a first semi-circular scraper ring and a second semi-circular scraper ring around the rod at a pre-determined distance from an end of the rod. At 304, the method 300 may optionally include attaching at least two scraper seal pieces around the rod. The attaching may include positioning a first semi-circular scraper seal and a second semi-circular scraper seal around the rod adjacent to the scraper ring.

Next, at 306, the method 300 includes attaching at least two collar pieces around the cylinder and the scraper ring (and optionally the scraper seal). The attaching may include positioning a first semi-circular collar and a second semi-circular collar around a retention feature of the cylinder. The cylinder may define pre-formed notches. The attaching may include aligning the collar with the pre-formed notches of the retention feature.

Next, at 308, the method 300 includes attaching two plate pieces around the rod. For example, the attaching may include positioning a first semi-circular plate and a second semi-circular plate around the rod such that a surface of each of the first semi-circular plate and the second semi-circular plate contacts a surface of both of the first semi-circular collar and the second semi-circular collar.

At 310, the method includes inserting a first plurality of fasteners and a second plurality of fasteners through the plate and collar. The first plurality of fasteners may be received in the notches of the retention feature. At 312, the method 300 includes tightening the fasteners. In this way, the plate and the collar cooperate to retain the scraper ring, and optionally the scraper seal, against the rod.

The method 300 may optionally include removing the scraper assembly from the hydraulic cylinder assembly. It should be appreciated that the method 300 does not require any disassembly of the hydraulic cylinder assembly to install or remove the scraper assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic cylinder for a work vehicle, the hydraulic cylinder comprising:

a cylinder extending between a first end and a second end;

a retention feature positioned adjacent to the first end of the cylinder, the retention feature projecting radially outward from the cylinder;

a rod slidingly disposed in the cylinder; and a scraper assembly comprising:

a ring including an outer surface and a radially spaced inner surface, the radially spaced inner surface contacting a portion of the rod;

a collar extending between a first surface and a radially spaced second surface, the collar circumscribing the retention feature, the collar including a first portion contacting the outer surface of the ring and contacting the retention feature; and a plate contacting the first surface of the collar, wherein the collar and the plate cooperate to radially compress the ring against the rod.

2. The hydraulic cylinder of claim 1, wherein the retention feature defines one or more notches.

3. The hydraulic cylinder of claim 2, wherein:

a first plurality of fasteners secure the plate to the collar, the first plurality of fasteners extend through each of the one or more notches, and the first plurality of fasteners cooperate to limit rotation of the plate and the collar relative to the cylinder.

4. The hydraulic cylinder of claim 3, wherein:

the first surface of the collar defines a plurality of apertures extending therethrough, a second plurality of fasteners are received in the plurality of apertures, and the second plurality of fasteners cooperate to secure the plate to the collar.

5. The hydraulic cylinder of claim 1, wherein:

the ring extends between a first surface and an axially spaced second surface, a step extends radially inward from the radially spaced inner surface and is positioned between the first surface of the ring and the axially spaced second surface of the ring, a first portion of the ring is defined between the first surface and the step, and a second portion of the ring is defined between the step and the axially spaced second surface.

6. The hydraulic cylinder of claim 5, wherein one of the first portion and the second portion of the ring contacts the rod and the other of the first portion and the second portion of the ring is spaced apart from the rod.

7. The hydraulic cylinder of claim 6, wherein the first surface of the ring contacts the plate, the axially spaced second surface of the ring contacts the collar, and the second portion of the ring contacts the rod.

8. The hydraulic cylinder of claim 6, wherein the first surface of the ring contacts the collar, the axially spaced second surface of the ring contacts the plate, and the second portion of the ring contacts the rod.

9. The hydraulic cylinder of claim 1, wherein the scraper assembly further comprises a seal.

10. The hydraulic cylinder of claim 9, wherein:

the seal includes an outer surface and an inner surface spaced radially inward from the outer surface, the outer surface of the seal contacts a third portion of the collar, and the inner surface of the seal contacts the rod.

11. The hydraulic cylinder of claim 1, wherein the ring is formed of a metallic material.

12. The hydraulic cylinder of claim 11, wherein the ring is formed of bronze, copper, alloys thereof, and combinations thereof.

13. The hydraulic cylinder of claim 1, wherein the ring includes a first semi-circular ring and a second semi-circular ring.

14. The hydraulic cylinder of claim 1, wherein the collar includes a first semi-circular collar and a second semi-circular collar.

15. The hydraulic cylinder of claim 1, wherein the plate includes a first semi-circular plate and a second semi-circular plate.

16. A hydraulic cylinder for a work vehicle, the hydraulic cylinder comprising:

a cylinder extending between a first end and a second end, wherein a retention feature is positioned adjacent to the first end;

a rod slidingly disposed in the cylinder; and a scraper assembly comprising:

a first semi-circular ring and a second semi-circular ring contacting the first semi-circular ring, the first semi-circular ring and the second semi-circular ring circumscribing and contacting a portion of the rod;

a first semi-circular collar and a second semi-circular collar contacting the first semi-circular collar, a first portion of each of the first semi-circular collar and the second semi-circular collar circumscribing the retention feature, and a second portion of each of the first semi-circular collar and the second semi-circular collar contacting the first semi-circular ring and the second semi-circular ring; and a first semi-circular plate and a second semi-circular plate contacting the first semi-circular plate, the first semi-circular plate and the second semi-circular plate circumscribing the rod, wherein the first semi-circular collar, the second semi-circular collar, the first semi-circular plate, and the second semi-circular plate cooperate to radially compress the first semi-circular ring and the second semi-circular ring against the rod.

17. The hydraulic cylinder of claim 16, wherein:

the first semi-circular plate contacts both the first semi-circular collar and the second semi-circular collar, and the second semi-circular plate contacts both the first semi-circular collar and the second semi-circular collar.

18. The hydraulic cylinder of claim 16, wherein the scraper assembly further includes a first semi-circular seal and a second semi-circular seal, wherein the first semi-circular collar, the second semi-circular collar, the first semi-circular plate, and the second semi-circular plate cooperate to radially compress the first semi-circular seal and the second semi-circular seal against the rod.

19. A method of assembling the hydraulic cylinder of claim 1, the method comprising:

attaching at least two scraper ring pieces of the ring of the scraper assembly around the rod;

attaching at least two collar pieces of the collar of the scraper assembly around the retention feature of a cylinder and the at least two scraper ring pieces;

attaching at least two plate pieces of the plate of the scraper assembly around the rod;

inserting a first plurality of bolts and a second plurality of bolts through the at least two plate pieces and the at least two collar pieces; and tightening the first plurality of bolts and the second plurality of bolts.

20. The method of claim 19, further comprising, prior to attaching the at least two collar pieces, attaching at least two scraper seal pieces around the rod.

21. The hydraulic cylinder of claim 1, wherein:

the ring includes a first semi-circular ring and a second semi-circular ring, the first semi-circular ring and the second semi-circular ring being joined at first joint portions;

the collar includes a first semi-circular collar and a second semi-circular collar, the first semi-circular collar and the second semi-circular collar being joined at second joint portions;

the plate includes a first semi-circular plate and a second semi-circular plate, the first semi-circular plate and the second semi-circular plate being joined at third joint portions; and the second joint portions and the third joint portions are located at mutually different circumferential positions with respect to the cylinder.

* * * * *